(12) United States Patent
Richardson

(10) Patent No.: US 8,503,342 B2
(45) Date of Patent: Aug. 6, 2013

(54) SIGNAL TRANSMISSION METHOD FROM A LOCAL NETWORK NODE

(75) Inventor: Andrew Richardson, Cambridgeshire (GB)

(73) Assignee: Airvana LLC, Chelmsford, MA (US)

( * ) Notice: Subject to any disclaimer, the term of this patent is extended or adjusted under 35 U.S.C. 154(b) by 1207 days.

(21) Appl. No.: 11/572,973

(22) PCT Filed: Aug. 1, 2005

(86) PCT No.: PCT/GB2005/003028
§ 371 (c)(1), (2), (4) Date: Jan. 30, 2007

(87) PCT Pub. No.: WO2006/010957
PCT Pub. Date: Feb. 2, 2006

(65) Prior Publication Data
US 2008/0069020 A1    Mar. 20, 2008

(30) Foreign Application Priority Data

Jul. 30, 2004 (GB) .................................. 0417020.5
Jul. 30, 2004 (GB) .................................. 0417021.3

(51) Int. Cl.
*G08C 17/00* (2006.01)

(52) U.S. Cl.
USPC ........... 370/311; 370/310; 370/318; 370/328; 455/127.1

(58) Field of Classification Search
USPC ................. 370/311, 310, 318, 328; 455/63.1, 455/114.2, 127, 296, 522
See application file for complete search history.

(56) References Cited

U.S. PATENT DOCUMENTS

| 5,111,535 | A | 5/1992 | Tokunaga |
| 5,239,572 | A | 8/1993 | Saegusa et al. |
| 5,499,395 | A | 3/1996 | Doi et al. |

(Continued)

FOREIGN PATENT DOCUMENTS

| EP | 0483547 | 5/1992 |
| EP | 0631397 | 12/1994 |

(Continued)

OTHER PUBLICATIONS

International Search Report and Written Opinion mailed Jan. 10, 2006 in corresponding PCT application No. PCT/GB2005/003028 (12 pages).

(Continued)

*Primary Examiner* — George Eng
*Assistant Examiner* — Jing Gao
(74) *Attorney, Agent, or Firm* — Fish & Richardson P.C.

(57) ABSTRACT

A transmitter is provided having transmission methods that minimize the power needed to ensure reliable reception in a coverage area. In one aspect, data that requires re-transmission as acknowledged mode data is re-transmitted when the power level of the transmission link is higher than a pre-determined level set for reliable reception. The data rate of the re-transmitted data is set according to the difference in the actual power and the pre-determined level. In a second aspect, two transmitting antennae are used to transmit the same signals with a frequency off-set. The frequency off-set can be used to determine the phase of the signals being received at the receiver, so that a phase off-set can be introduced to optimise the effect of interference at the receiver.

21 Claims, 10 Drawing Sheets

U.S. PATENT DOCUMENTS

| | | |
|---|---|---|
| 5,602,843 A | 2/1997 | Gray |
| 5,796,729 A | 8/1998 | Greaney et al. |
| 6,038,450 A | 3/2000 | Brink et al. |
| 6,041,236 A | 3/2000 | Bernardin et al. |
| 6,317,435 B1 | 11/2001 | Tiedemann et al. |
| 6,339,697 B1 | 1/2002 | Ranta |
| 6,438,379 B1 | 8/2002 | Gitlin et al. |
| 6,445,917 B1 | 9/2002 | Bark et al. |
| 6,496,700 B1 | 12/2002 | Chawla et al. |
| 6,643,813 B1 * | 11/2003 | Johansson et al. ............ 714/748 |
| 6,650,872 B1 | 11/2003 | Karlsson |
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,009,944 B1 | 3/2006 | Hulbert |
| 7,076,252 B1 | 7/2006 | Hirvonen |
| 7,170,871 B2 | 1/2007 | Eyuboglu et al. |
| 7,193,978 B2 | 3/2007 | Ishikawa et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,373,161 B2 | 5/2008 | Anderson |
| 7,558,356 B2 | 7/2009 | Pollman et al. |
| 7,558,588 B2 | 7/2009 | To et al. |
| 7,603,127 B2 | 10/2009 | Chung et al. |
| 8,290,527 B2 | 10/2012 | Richardson |
| 8,311,570 B2 | 11/2012 | Richardson |
| 2001/0004597 A1 | 6/2001 | Hirahara |
| 2001/0023189 A1 * | 9/2001 | Kajimura ................... 455/522 |
| 2001/0046859 A1 | 11/2001 | Kil |
| 2002/0009998 A1 | 1/2002 | Reemtsma |
| 2002/0028691 A1 * | 3/2002 | Moulsley et al. ............ 455/522 |
| 2002/0045451 A1 | 4/2002 | Hwang et al. |
| 2002/0075825 A1 | 6/2002 | Hills et al. |
| 2002/0110104 A1 | 8/2002 | Surdila et al. |
| 2002/0119798 A1 | 8/2002 | Hamabe |
| 2002/0131387 A1 | 9/2002 | Pitcher et al. |
| 2002/0137522 A1 * | 9/2002 | Landais et al. ................ 455/455 |
| 2002/0142788 A1 | 10/2002 | Chawla et al. |
| 2002/0160790 A1 | 10/2002 | Schwartz |
| 2002/0187789 A1 | 12/2002 | Diachina et al. |
| 2002/0196749 A1 | 12/2002 | Eyuboglu et al. |
| 2003/0033394 A1 | 2/2003 | Stine |
| 2003/0100311 A1 | 5/2003 | Chung et al. |
| 2003/0134656 A1 | 7/2003 | Chang et al. |
| 2004/0136336 A1 | 7/2004 | Nakamura et al. |
| 2004/0166887 A1 | 8/2004 | Laroia et al. |
| 2004/0203725 A1 | 10/2004 | Lahav et al. |
| 2004/0259560 A1 * | 12/2004 | Hosein et al. ............... 455/452.1 |
| 2005/0025098 A1 | 2/2005 | Terabe |
| 2005/0136961 A1 | 6/2005 | Simonsson et al. |
| 2005/0157673 A1 | 7/2005 | Verma et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0009177 A1 | 1/2006 | Persico et al. |
| 2006/0067422 A1 | 3/2006 | Chung |
| 2006/0067451 A1 | 3/2006 | Pollman et al. |
| 2006/0077924 A1 | 4/2006 | Rune |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2009/0262697 A1 | 10/2009 | To et al. |
| 2011/0317574 A1 | 12/2011 | Richardson |

FOREIGN PATENT DOCUMENTS

| | | |
|---|---|---|
| EP | 0766427 | 4/1997 |
| EP | 0817516 | 1/1998 |
| EP | 0987868 | 3/2000 |
| EP | 1 207 646 A1 | 5/2002 |
| EP | 1411670 | 4/2004 |
| EP | 1779543 | 4/2012 |
| GB | 2304495 | 3/1997 |
| GB | 2336069 | 10/1999 |
| GB | 2360909 | 10/2001 |
| GB | 2366689 | 3/2002 |
| GB | 2372909 | 9/2002 |
| GB | 2390953 | 1/2004 |
| GB | 2408430 | 5/2005 |
| GB | 2452688 | 3/2009 |
| JP | 08140135 | 5/1996 |
| JP | 110175425 | 7/1999 |
| WO | WO 9526094 | 9/1995 |
| WO | WO 98/09455 | 3/1998 |
| WO | 99/43109 A1 | 8/1999 |
| WO | 00/18014 A1 | 3/2000 |
| WO | WO 00/28752 | 5/2000 |
| WO | 01/52427 A1 | 7/2001 |
| WO | 01/56147 A1 | 8/2001 |
| WO | 02/07341 A2 | 1/2002 |
| WO | 02/07380 A2 | 1/2002 |
| WO | 02/07471 A1 | 1/2002 |
| WO | 02/07472 A1 | 1/2002 |
| WO | 02/37882 A1 | 5/2002 |
| WO | WO02/37798 | 5/2002 |
| WO | 02/49275 A2 | 6/2002 |
| WO | 02/085056 A1 | 10/2002 |
| WO | 02/087192 A1 | 10/2002 |

| | | |
|---|---|---|
| WO | WO02/104056 | 12/2002 |
| WO | 03/025768 A1 | 3/2003 |
| WO | 03/041277 A2 | 5/2003 |
| WO | 03/044949 A2 | 5/2003 |
| WO | 03/044961 A2 | 5/2003 |
| WO | 03/049299 A2 | 6/2003 |
| WO | 03/084084 A1 | 10/2003 |
| WO | 03/103162 A1 | 12/2003 |
| WO | 2004/019596 A1 | 3/2004 |
| WO | 2004/032548 A1 | 4/2004 |
| WO | 2004/042934 A1 | 5/2004 |
| WO | 2004/042990 A1 | 5/2004 |
| WO | 2004/054124 A1 | 6/2004 |
| WO | 2004/059959 A1 | 7/2004 |
| WO | 2004/063937 A2 | 7/2004 |
| WO | 2004/077693 A1 | 9/2004 |
| WO | 2004/080018 A1 | 9/2004 |
| WO | 2004/082149 A2 | 9/2004 |
| WO | WO 2006/010953 | 2/2009 |
| WO | WO 2006/010957 | 2/2009 |
| WO | WO 2006/010958 | 2/2009 |

OTHER PUBLICATIONS

International Search Report and Written Opinion mailed Jul. 26, 2006 in corresponding PCT application No. PCT/GB2005/003034, Publication No. WO 2006/010958 (17 pages).
International Search Report and Written Opinion mailed Feb. 24, 2006 in corresponding PCT application No. PCT/GB2005/003007, Publication No. WO 2006/010953 (15 pages).
Hamabe K. et al., "Distributed Dynamic Channel Allocation for the Evolution of TDMA Cellular Systems" IEICE Transactions on Communications, Institute of Electronics Information and Comm. Eng. Tokyo, JP, vol. E79-B, No. 3, Mar. 1, 1996, pp. 230-236, XP000588444, ISSN: 0916-8516, paragraphs 03.3, 04.1.
Furukawa H et al., "A microcell overlaid with umbrella cell system" Vehicular Technology Conference, 1994 IEEE 44$^{th}$ Stockholm, Sweden Jun. 8-10, 1994, New York, NY, USA, IEEE, Jun. 8, 1994, pp. 1455-1459, XP010123320 ISBN: 0-7803-1927-3 (p. 1456, left-hand column, line 1—p. 1457, left-hand column, line 5; figure 4).
Universal Mobile Telecommunications System (UMTS); Provision of Services in UMTS—The Virtual Home Environment (Highlighting release 99 requirement), TS 22.21 V1.10.0, Jan. 1999, 22 pages.
3$^{rd}$ Generation Partnership Project; Technical Specification Group Radio Access Network; Physical layer-Measurements (FDD) (Release 4), 3GPP TS 25.215 V4.6.0 (Dec. 2002), 18 pages.
3$^{rd}$ Generation Partnership Project; Technical Specification Group Core Network and Terminals; Signalling Flows for The IP Multimedia Call Control Based on Session Initiation Protocol (SIP) and Session Description Protocol (SDP); Stage 3 (Release 5), 3GPP TS 24.228 V5.15.0 (Sep. 2006), 851 pages.
3$^{rd}$ Generation Partnership Project; Technical Specification Group Core Network and Terminals; Handover Procedures (Release 7), 3GPP TS 23.009 V7.0.0 (Mar. 2007), 287 pages.
3$^{rd}$ Generation Partnership Project; Technical Specification Group Services and Systems Aspects; Network Architecture (Release 8), 3GPP TS 23.002 V8.0.0 (Jun. 2007), 62 pages.
3$^{rd}$ Generation Partnership Project; Technical Specification Group Core Network and Terminals; IP Multimedia Call Control Protocol Based on Session Initiation Protocol (SIP) and Session Description Protocol (SDP); Stage 3 (Release 8), 3GPP TS 24.229 V8.0.0 (Jun. 2007), 438 pages.
3$^{rd}$ Generation Partnership Project; Technical Specification Group Radio Access Network; UTRAN Iu interface RANAP Signalling (Release 7), 3GPP TS 25.413 V7.6.0 (Jun. 2007), 359 pages.
3$^{rd}$ Generation Partnership Project; Technical Specification Group Core Network and Terminals; Mobile Application Part (MAP) Specification; (Release 8), 3GPP TS 29.002 V8.2.0 (Jun. 2007), 911 pages.
Patent Abstracts of Japan vol. 1996, No. 09, Sep. 30, 1996.
Patent Abstract of Japan JP 08 140135 A (NEC Corp), May 31, 1996.

Armbruester H., "Dritte Generation Der MobilKommunikation" Telecom Report, De, Siemens Ag. Munchen, vol. 15, No. 2, Mar. 1, 1992, pp. 60-63, XP000274586, ISSN: 0344-4724.
Universal Mobile Telecommunications System (UMTS); Provision of Services in UMTS—The Virtual Home Environment (Highlighting release 99 requirement), TS 22.21 V1.10.0, (Jan. 1999), 22 pages.
3rd Generation Partnership Project; Technical Specification Group Radio Access Network; Physical layer—Measurements (FDD) (Release 4), 3GPP TS 25.215 V4.6.0 (Dec. 2002), 18 pages.
3rd Generation Partnership Project; Technical Specification Group Core Network and Terminals; Signalling Flows for the IP Multimedia Call Control Based on Session Initiation Protocol (SIP) and Session Description Protocol (SDP); Stage 3 (Release 5), 3GPP TS 24.228 V5.15.0 (Sep. 2006), 851 pages.
3rd Generation Partnership Project; Technical Specification Group Core Network and Terminals; Handover Procedures (Release 7), 3GPP TS 23.009 V7.0.0 (Mar. 2007), 287 pages.
3rd Generation Partnership Project; Technical Specification Group Services and Systems Aspects; Network Architecture (Release 8), 3GPP TS 23.002 V8.0.0 (Jun. 2007), 62 pages.
3rd Generation Partnership Project; Technical Specification Group Core Network and Terminals; IP Multimedia Call Control Protocol Based on Session Initiation Protocol (SIP) and Session Description Protocol (SDP); Stage 3 (Release 8), 3GPP TS 24.229 V8.0.0 (Jun. 2007), 438 pages.
3rd Generation Partnership Project; Technical Specification Group Radio Access Network; UTRAN Iu interface RANAP Signalling (Release 7), 3GPP TS 25.413 V7.6.0 (Jun. 2007), 359 pages.
3rd Generation Partnership Project; Technical Specification Group Core Network and Terminals; Mobile Application Part (MAP) Specification; (Release 8), 3GPP TS 29.002 V8.2.0 (Jun. 2007), 911 pages.
Office Action from European Application No. 05 767 588.6-1237 dated Apr. 19, 2011.
Gupta (IEEE 802.21 Media Independent Handover Service, Draft Technical Requirements, 21-04-0087-00-0000, Jul. 12, 2004).
Plasse (SIP for Call Control in the 3G IP-Based UMTS Core Network, Interworking 2000, LNCS 1938, pp. 32-38, 2000).
Lin et al. (One-Pass GPRS and IMS Authentication Procedure for UMTS, Jan. 23, 2004).
EP Examination Report for Application No. 05767920.1, mailed Jun. 10, 2008, 6 pages.
Response to EP Examination Report for Application No. 05767920. 1, mailed Jun. 10, 2008, filed Dec. 18, 2008, 2 pages.
International Preliminary Report on Patentability from PCT application No. PCT/GB2005/003028 mailed Jan. 11, 2006, 8 pages.
EP Examination Report for Application No. 05767588.6, mailed Apr. 19, 2011, 5 pages.
Response to EP Examination Report for Application No. 05767588. 6, mailed Apr. 19, 2011, filed Aug. 22, 2011, 9 pages.
USPTO Office Action in U.S. Appl. No. 11/572,977, mailed May 12, 2010, 36 pages.
Fish and Richardson, P.C., Response to USPTO Office Action for U.S. Appl. No. 11/572,977, filed Nov. 10, 2010, 40 pages.
USPTO Final Office Action in U.S. Appl. No. 11/572,977, mailed Apr. 22, 2011, 26 pages.
Fish and Richardson, P.C., Response to USPTO Final Office Action for U.S. Appl. No. 11/572,977, filed Oct. 24, 2011, 14 pages.
International Preliminary Report on Patentability issued Jan. 30, 2007 in PCT application No. PCT/GB2005/003034, Publication No. WO 2006/010958 (10 pages).
Fish and Richardson, P.C., Preliminary Amendment for U.S. Appl. No. 13/074,813, filed Mar. 29, 2011, 9 pages.
Fish and Richardson, P.C., Amendment for U.S. Appl. No. 13/074,813, filed Jun. 11, 2012, 8 pages.
Fish and Richardson, P.C., Amendment for U.S. Appl. No. 13/074,813, filed Oct. 5, 2012, 8 pages.

* cited by examiner

SIGNAL TRANSMISSION METHOD FROM A LOCAL NETWORK NODE

This application is a U.S. national phase application filed under 35 U.S.C. §371 of International application PCT/GB2005/003028, filed on Aug. 1, 2005, designating the United States, which claims the benefit of Great Britain Applications Nos. 0417020.5 and 0417021.3, filed on Jul. 30, 2004, which are hereby incorporated by reference herein.

The invention relates to methods of transmission of signals between a transmitter and a mobile station, and in particular to methods for transmitting signals between a local network node and a user terminal such that the user terminal can connect to a 3G network.

3G cellular communication systems and in particular the Frequency Division Duplex or Time Division Duplex (FDD/TDD) mode of the Wideband Code Division Multiple Access (WCDMA) system, defined by the Third Generation Partnership Project (3GPP), are known and are described in more detail at www.3gpp.org.

The 3G cellular communication system provides subscribers with the ability to transmit text, digitised voice, video and other multi-media data from their mobile handset. The system is presently implemented by the Universal Mobile Telecommunications System (UMTS) which builds on the existing Global System for Mobile Communications (GSM) network and General Packet Radio Service (GPRS) technology. The initial specification for UMTS was referred to as 'Release 99', (R99) and defined the standard network architecture for UMTS systems. More recently 'Release 5' (R5) has been developed, expanding the Release 99 functionality to include The IP Multimedia Subsystem (IMS). This provides an all Internet Protocol based wireless network, in comparison to the separate voice, data, signalling, and control network elements of Release 99 systems. Release 99 and Release 5 architecture will now be described in more detail by way of background and with reference to FIG. 1.

The circuit switched (CS) domain 2 of the Release 99 architecture is illustrated in the lower part of FIG. 1. User Equipment (UE) 4 will normally connect to the Node B 6, the Node B to the Radio Network Controller (RNC) 8 and the RNC to a Mobile Switching Centre (MSC) 10 in this case the MSC_B. The MSC allows interconnection to other networks and to the Public Switched Telephone Network (PSTN) 12. The MSC_B has access to the home location register (HLR) 14 and to the Authentication Centre (AuC) via the HLR.

The upper half of FIG. 1 illustrates the Release 5 IMS network architecture 20. In addition to the Node B 22 and the RNC 24, there is the Packet Switched PS domain Serving GPRS Support Node and Gateway GPRS Support Node (SGSN/GGSN) 26 and the IMS specific components such as Proxy-Call Session Control Function (P-CSCF) 28, Serving-Call Session Control Function (S-CSCF) 30, the Home Subscriber Server (HSS) 32, the Media Gateway Control Function (MGCF) 34 and the media gateway (MGW) 34 which connects to the PSTN 36.

The media sessions are established from the UE 4 via the PS domain and the P-CSCF and the S-CSCF. If the media session is via an external network such as the PSTN or another Public Land Mobile Network (PLMN) then the MGCF and the MGW are also required. The structure and operation of the IMS within the R5 network architecture are well known by those skilled in the art and are defined in the 3GPP specifications TS23.002, TS24.228 and TS24.229.

The known transmission scheme referred to as acknowledged mode transmission provides a reliable way of transmitting data between two points. The data that is received at the UE is checked for errors, and any errors that are found are reported to the Radio Link Controller (RLC) in the RNC 8. Retransmission of the data is requested by the UE through a STATUS message. The RNC detects this and retransmits the data to the UE via the Node B, which is located closer to the UE.

Although the acknowledged mode allows data to be received more reliably, when operating using the acknowledged mode of operation, the transmission may suffer long delays due to the transmission time across the link from the RNC to the UE via the Node B, and acknowledgements being sent back from the UE to the RNC. Typically delays approaching 100 ms may occur. In addition, there is no guarantee that the data being retransmitted will be received without errors, and consequently further re-transmissions may be required. These delays, as well as un-reliable transmission will result in high delays and a reduced efficiency in the throughput for the link, which is undesirable. We have appreciated that it is desirable to schedule the acknowledge mode data more effectively.

In addition to the above described elements, FIG. 1 illustrates a Local Network Node (LNN) 40, developed by the applicants, which provides supplemental controlled access to the Release 99 and Release 5 network architectures bypassing Node B's 6 and 22. The LNN is described in more detail in the applicant's co-pending patent application entitled "Local Network Node", application no. 0509315.8.

As mentioned above, the UE 4 normally connects to the network via Node B typically co-located with a Base Transceiver Station of the underlying GSM system. The LNN however provides a local user-controlled access point for the network, that may be installed in the home or office. By means of the LNN, a user can regulate local subscribers' access to the network.

Essentially, the LNN is a composite of elements of a Node B, an RNC, MSC, SGSN, GGSN and P-CSCF. In order to accommodate the LNN in the Release 99 architecture, the SIP/MSC_A element 16 is provided, logically connected to MSC_B 10, HLR/AuC 14 and PSTN 12. The SIP/MSC_A is configured to convert the Session Initiation Protocol commands from the UE 4, which are used to establish a session on an IP network, to the ISDN User part (ISUP/SS7) messages used to manage calls over a PSTN, and vice versa.

Thus, where a LNN is installed, the UE will connect to the Release 99 network via the LNN and SIP/MSC_A element 16, and to the Release 5 architecture via the LNN and S-CSCF 30.

At the interface to the R99 network, the UE will look like an SIP client that establishes circuit switched connections to the SIP enabled MSC, using the SIP signalling protocol. The SIP messages are used to transport the circuit switched signalling messages to the MSC, which then looks like an MSC as far as the remainder of the external network is concerned.

At the interface between the LNN 40 and the S-CSCF 30, the LNN looks like a UE communicating with the S-CSCF through a P-CSCF. Preferably, the messages from the LNN to the S-CSCF conform with the interface defined within the 3GPP specifications. The decision as to which network architecture the LNN will connect to is an operator decision. It may be the R99 circuit switched architecture, or it may be the R5 IMS architecture.

As mentioned earlier the LNN is intended for local installation in the home or office for example. In general, the coverage area of the LNN cell, hereafter referred to as a pico-cell, will overlap with the overlaying network cell hereafter referred to as a macro-cell. In addition, it is likely that the pico-cell will operate on the same frequency as the macro-cell for reasons of frequency economy.

The deployment of the pico-cells will occur in an uncoordinated and ad-hoc fashion as LNNs are installed to meet user requirements. The power levels of the pico-cells will need to be high enough for satisfactory connection with the local UEs. In this arrangement, the downlink transmissions from the pico-cell will interfere with the downlink transmissions from the macro-cell, and the interference is likely to result in degradation in the coverage of the macro-cell. We have therefore appreciated that it is desirable to regulate the power of the signals transmitted by the LNN.

SUMMARY OF INVENTION

The invention is defined in the independent claims to which reference should now be made. Advantageous features are set forth in the appendent claims.

A transmitter is provided, according to preferred embodiments of the invention, having transmission methods that minimize the power needed to ensure reliable reception in a coverage area. In one aspect, data that requires re-transmission as acknowledged mode data is re-transmitted when the power level of the transmission link is higher than a pre-determined level set for reliable reception. The data rate of the re-transmitted data is set according to the difference in the actual power and the pre-determined level. In a second aspect, two transmitting antennae are used to transmit the same signals with a frequency off-set. The frequency off-set can be used to determine the phase of the signals being received at the receiver, so that a phase off-set can be introduced to optimise the effect of interference at the receiver.

A corresponding method is also provided.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENT

Figure 1:
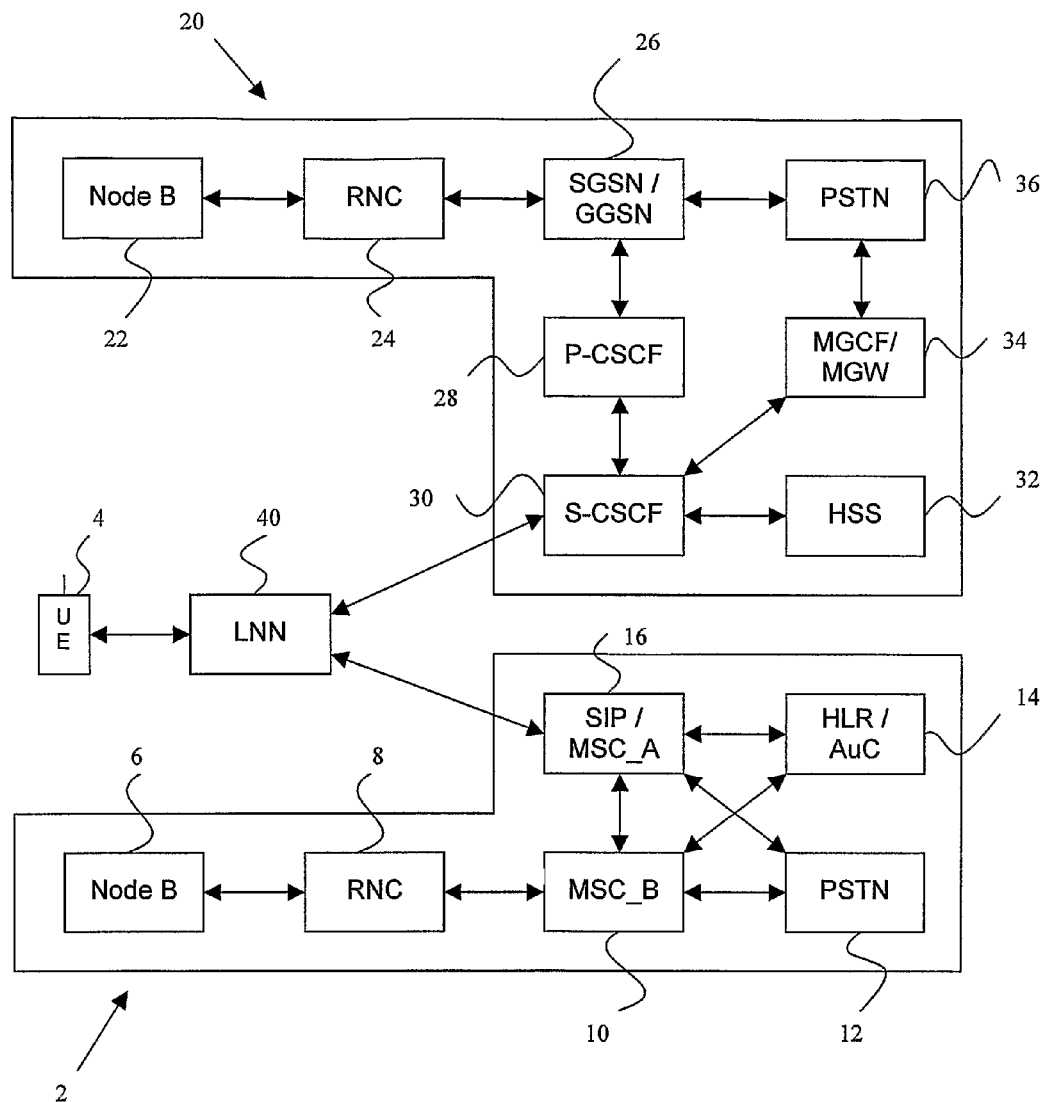
FIG. 1 is an illustration of a system according to a preferred embodiment of the invention.
Figure 2:
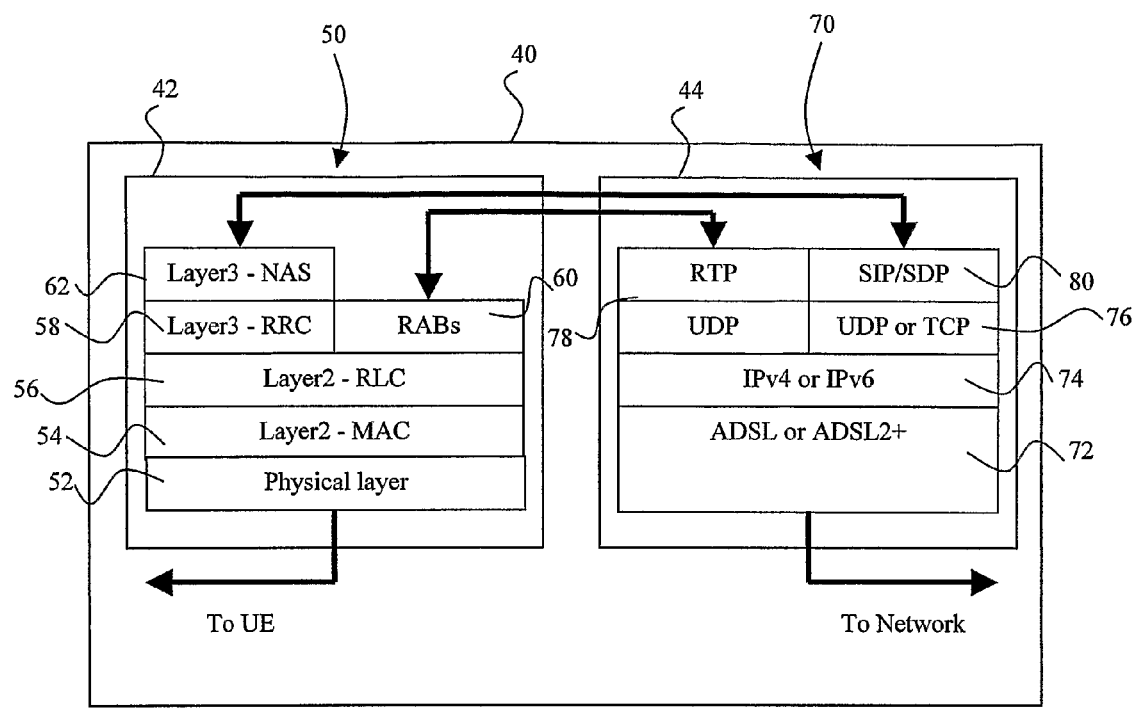
FIG. 2 is a schematic illustration of the logical protocols employed within the local network node according to a preferred embodiment of the invention.

The operation of the Local Network Node embodying the invention will now be described in more detail with respect to FIGS. 2 and 3.

The LNN according to the preferred embodiment of the invention is both a transmitter and a receiver establishing a transmission link with a UE in the coverage cell provided by the LNN. The LNN is also arranged to convert 3G protocol messages received from the UE To SIP messages used to establish and maintain sessions on an Internet Protocol based network. The physical and logical structure of the LNN is illustrated in more detail in FIG. 2 to which reference should now be made.

The LNN comprises a User terminal side 42 comprising a standard 3G protocol processing stack for communicating with the User Terminal 4 over the air interface, and a Network Side 44 comprising Internet Protocol processing stack 70.

In known fashion, the 3G protocol stack contains Physical layer 52, above which are located the Layer 2 Medium Access Control (MAC) layer 54, the Layer 2 Radio Link Control (RLC) layer 56, the Layer 3 Radio Resource Control (RRC) layer 54, including the Radio Access Bearer (RAB) control function 60, and the Layer 3 Non-Access Stratum (NAS) function 62 in turn.

The Physical layer manages the modulation of data packets from the upper layers onto the RF carrier, including the application of the CDMA spreading and scrambling codes in UMTS applications. It is therefore responsible for the transmission of data over the air interface via a number of transport channels. The physical layer also makes a number of basic measurements of the received power of the uplink.

The layer 2 Medium Access Control layer 54 manages the logical flow of data from the higher layers to the Physical layer and determines the mapping of the logical channels to the transport channels.

The layer 2 Radio Link Control RLC 56 is responsible for defining different types of data transfer service, namely Transparent Mode, Unacknowledged Mode and Acknowledged Mode, as well as quality of service settings, unrecoverable error notification, ciphering and so on.

The layer 3 Radio Resource Control Layer 58 handles the signalling between the user terminal and the network, including the establishment, maintenance, and release of connections, outer loop power control, ciphering control, timing advance in the TDD mode, user terminal measurement report and evaluation, as well as paging and notifying.

The layer 3 Radio Resource Control layer 58, in conjunction with the Radio Access Bearer function 60, controls the establishment, maintenance, and release of radio bearers for the media session.

Lastly, the layer 3 Non-access stratum function 62 controls the transmission of information such as mobility management signalling and broadcast information. A message received in a 3G system will first be received by the physical layer and will flow up through each layer to the third or application layer, where it can be transmitted across the network to the designated recipient. On receipt, the message would flow down through the layers in the opposite direction.

In typical 3G systems, the Node B provides the physical layer, the RNC provides the layer 2 functionality and the Layer 3 RRC and RABs control, while the MSC/SGSN would provide the layer 3 NAS. In the preferred embodiment all of these functions are contained within the Local Network Node. Additionally, the LNN is arranged to provide protocol conversion between the 3G messages from the UE to the equivalent SIP and Session Description protocol (SDP) messages required for transmission across Internet Protocol based networks, such as the Release 5 architecture.

The Internet Protocol stack 70 contains an ADSL (Asymmetric Digital Subscriber Line) layer 72, above which are logically situated Internet Protocol functions 74, and User Datagram Protocol (UDP) or UDP and Transmission Control Protocol (TCP) layer 76 in turn. Above the UDP layer are Real Time Protocol (RTP) 78, and Session Initiation Protocol/Session Description protocol (SIP/SDP) 80. The ADSL block controls the transmission of the digital information on the phone line of the network, according to routing information provided by the Internet protocol block 74.

Thus, a 3G encoded message from a User Terminal is received by the LNN and converted into an SIP encoded message for transmission to a network. The connection between the LNN and the network, could be either through a wire or cable connection to a dedicated phone line, or wirelessly to a phone line connector.

Figure 3:
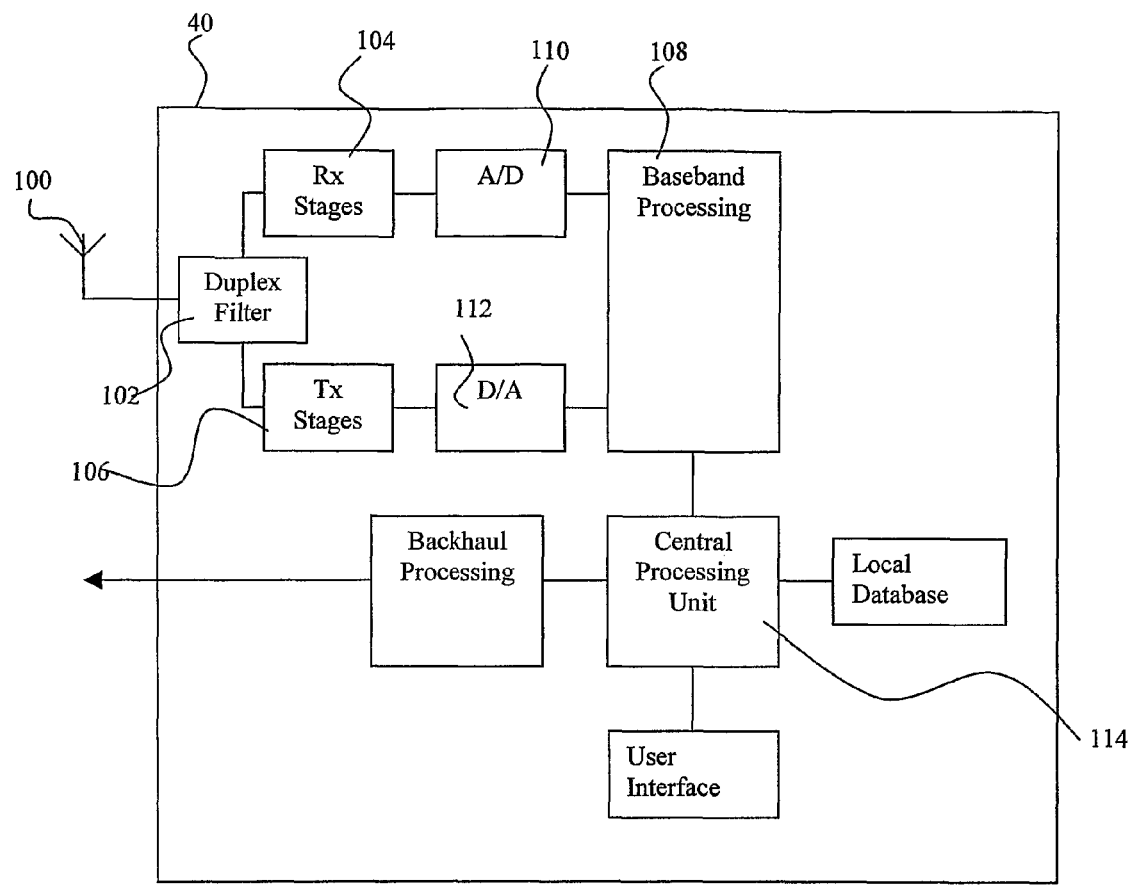
FIG. 3 is a schematic illustration of the principle processing blocks in the local network node according to a preferred embodiment of the invention.

FIG. 3 shows the LNN 40, having an antenna 100, which may be internal or external. Assuming a Frequency Division Duplex (FDD) transmission scheme is used, the antenna is connected to duplex filter 102, which manages the two frequencies used for the uplink from and the downlink to the UE. The filter 102 is connected to separate Receiver and Transmitter Stages 104 and 106 respectively, which are connected to the baseband processor unit 108, by Analogue to Digital Converter 110 and Digital to Analogue Converter 112 respectively. On the receiver side the baseband processor unit converts the received signal identified by the duplex filter into a data signal for presenting to the physical layer and subsequent layers of the first protocol stack 50. On the transmitting side, the baseband processor unit receives a signal from the physical layer and passes this through the duplex filter for transmission at the antenna.

It will be appreciated that if the Time Division Duplex mode is used then the uplink and downlink frequencies are the same, and the duplex filter is therefore replaced by a duplex switch which separates the signals in the time domain.

The central processing unit 114 contains code defining the various level protocols illustrated in FIG. 3 for the User Terminal and Network sides 42 and 44. It also contains most of the protocol layers shown in FIG. 2, as well as the code necessary to transform between one protocol and the other at the upper layers of each protocol stack.

The preferred operation of the LNN will now be described in more detail. This operation is concerned with the scheduling of the acknowledged mode data based on the capacity and reliability of the radio channel. To achieve this the physical layer and the RLC are linked via a controller, which will be described in more detail later.

Figure 4:
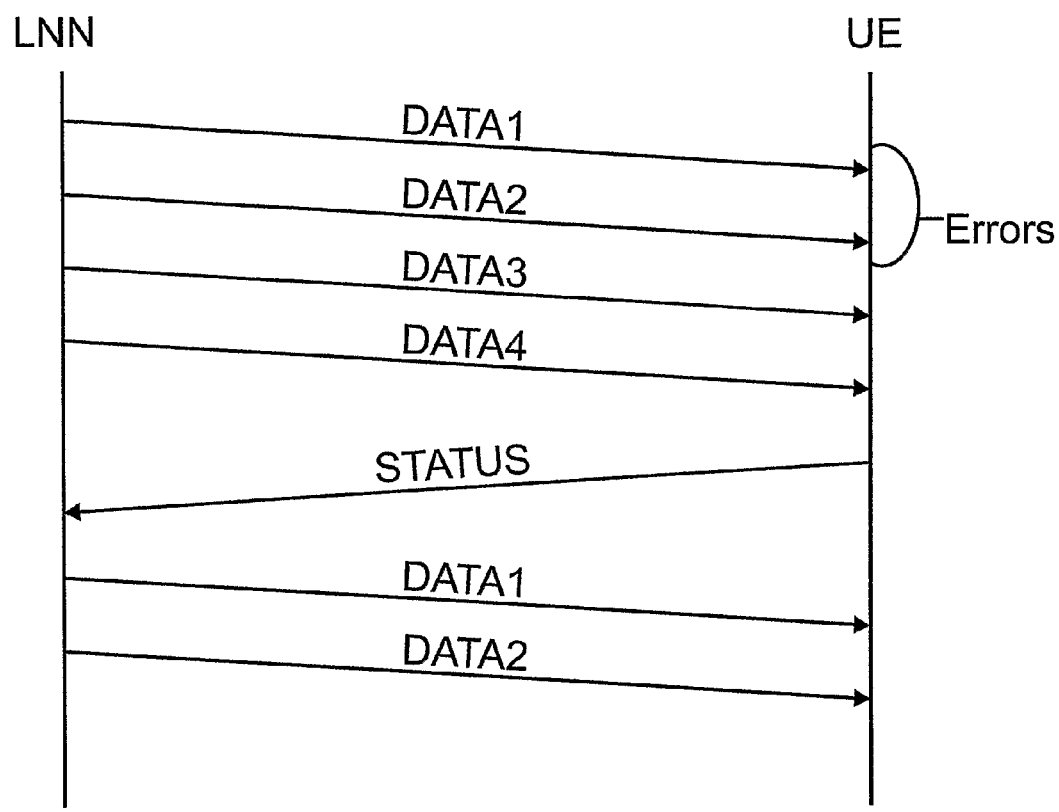
FIG. 4 illustrates the basic operation of the RLC acknowledge mode transmission.

We will first consider FIG. 4, which illustrates the normal operation of the RLC acknowledged mode. The data is transmitted in Packet Data Units (PDUs) from the LNN to the UE, and the UE operates using corresponding OSI layer protocols described above for the LNN to receive and transmit signals. At the UE in the lower layers, the UE checks the data for errors, and confirms that the data has been received without errors by transmitting an acknowledge or ACK message to the RLC of the LNN. Alternatively, any errors in the data will be indicated to the RLC layer of the UE, which then requests re-transmission through the use of a STATUS message transmitted to the RLC of the LNN. Each packet that is sent to the UE, is therefore stored for a short while in the memory or buffers of the RLC Layer, until an acknowledge message is received, in case re-transmission should be required.

In the operation of the known Release 99 and Release 5 architecture, no account is taken of the RLC radio channel on which the ACK and STATUS signals are transmitted. This is because of the delay or latency that exists between a normal Node B in the physical layer, which is close to the UE, and the RLC layer of the RNC, which may be some distance away. The preferred embodiment however provides the RLC layer on top of the physical layer, allowing fast and efficient utilisation of the radio channel for acknowledge mode data. In the LNN, the RLC and the physical layer are in the same unit and so it is possible to interact quickly.

Figure 5:
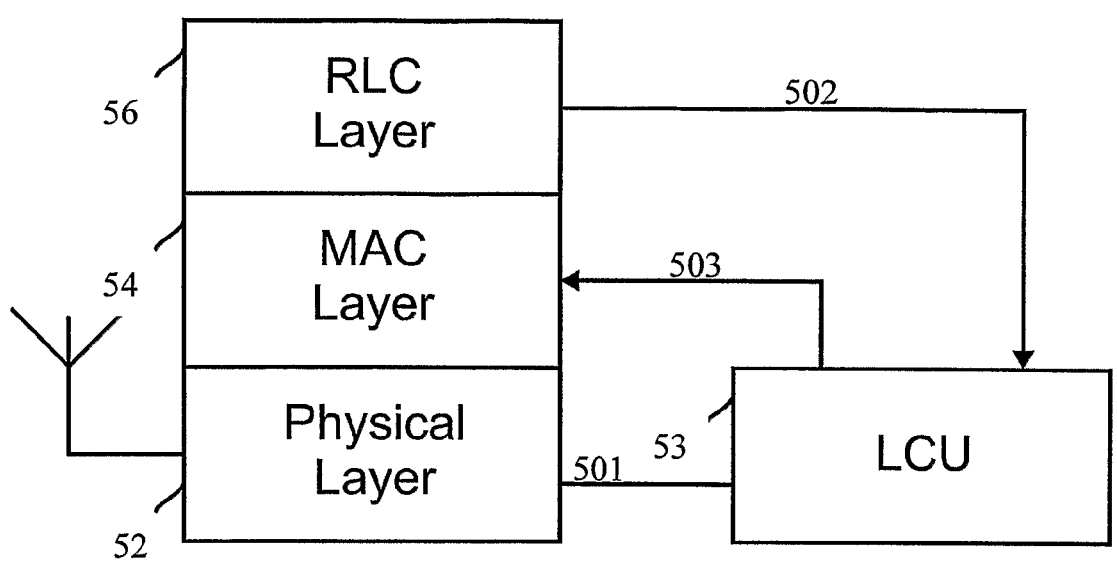
FIG. 5 illustrates the lower layers and the relationship between the control function and the scheduling in the RLC.

FIG. 5 illustrates in more detail the physical layer 52, the MAC layer 54 and the RLC layer 56 of the preferred embodiment. A data or link control unit (LCU) 53 is also shown. The transmission data is buffered in the RLC 56 until it is requested for transmission by the MAC 54 as is well known by those skilled in the art.

The LCU receives power control commands from the physical layer 52 via connection 501 and based on these decides what data to schedule for the LNN in the downlink. The power control commands will be received by the physical layer from the UE, as the UE is monitoring the power of the transmission link to ensure that reception can occur reliably.

The LNN is arranged such that when a command to increase the power is received, the physical layer responds accordingly by raising the power level for the downlink. This is to ensure that the signals on the downlink can be received at the UE at a pre-determined level of reliability. This might for example require that the power control be set so that on average, only 1 packet in 10 needs to be re-transmitted. While the power level is at the minimum or prescribed level indicated by the physical layer, the LCU communicates with the MAC layer on link 503 so that the acknowledge mode data in the RLC buffer is not transmitted, and preference is given to any circuit switched data.

On the other hand, when a power control command is received requesting that the power level be reduced for the downlink, the power level is maintained at the same rate without reduction. This results in the power level for the link being temporarily higher than required by the measurements made in the physical layer. Of course, at some point, it is necessary to re-set the power level to a pre-determined start value, so that it does not remain high indefinitely. The conditions which are met when this occurs are set out below.

There will therefore be an actual power level and a predetermined power level for maintaining an acceptable level of transmission. The actual level will always be equal to or above the predetermined level, as the control of the power introduces a tendency for the actual power level to become artificially high. As the power level is reset to the predetermined level, either periodically, or when there is no data for re-transmission, the control of the power level still means that disruption to neighbouring coverage cells is kept to a minimum.

The physical layer can therefore be thought of as a power control unit for the downlink, as it controls the power based on commands it receives from the UE. Implementing the operations described above can therefore be achieved by adapting the standard code of the physical layer appropriately.

The LNN under command from the LCU takes advantage of the occasions when the downlink has a higher power level than required to transmit the acknowledge mode data requiring re-transmission, along with the necessary real time data that must be transmitted to maintain any circuit switched connections. Additionally, the amount of data being transmitted can be modified by changing the data rate based on the quality of the link. The co-location of the RLC and the physical layer in the same device, therefore allow the Acknowledge mode data to be transmitted more quickly to the UE than previously. The fact that the acknowledge mode data is transmitted at times when the power level of the link is higher than normal, also means that the acknowledged mode data is more likely to be received reliably at the UE.

The data rate for the data that is to be retransmitted is also preferably dependent on the amount of data that is remaining in the buffer of the RLC Layer. The LCU is therefore also arranged to receive via connection 502 from RLC Layer 56, an indication of how much data there is in the RLC buffer that requires retransmission. Such data will be flagged in the RLC buffer to distinguish it from the other buffered data, when a STATUS message requesting retransmission is received from the UE. The data rate can then be made higher when there is more data to transmit.

Preferably, the analysis of the power control commands by the LCU is made over a predetermined period of time. Although the actual power might be increased in response to power control commands over this period, the decision as to what data to transmit is preferably made at the end of the period. If at the end of the time period, the power level of the link is higher than actually required, the acknowledge mode data will be transmitted in the next period, along with any real time data. When any acknowledge mode data in the buffer requiring re-transmission has been retransmitted, the power level can be re-set to the pre-determined start value.

The operation of a simple processing algorithm implemented in the LCU will now be described in more detail with reference to FIG. 6.

Figure 6:
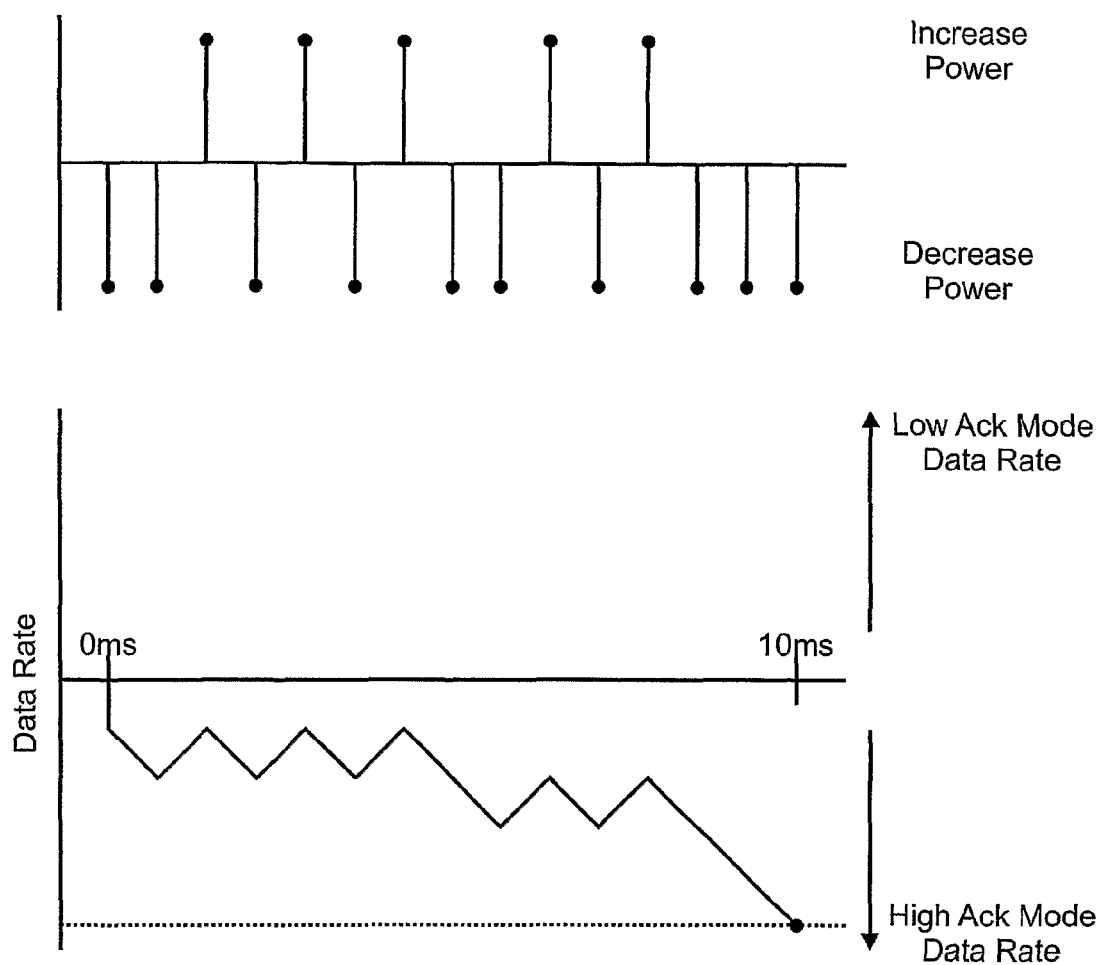
FIG. 6 illustrates the receipt of the power control commands and the response to the power control commands within the processing unit in the LNN.

The top portion of FIG. 6 represents the power control pulses received over the 10 ms of the summation period, while the bottom portion of FIG. 6 indicates the value of the sum as it changes over time. In the example of FIG. 6, it can be seen that more negative control pulses are received than positive pulses, and as a result the sum becomes increasingly negative over time.

The LCU is arranged to sum up the power control commands over a period of time. The definition of the period is variable and is probably best related to the Transmission Time Interval (TTI). This is the interval at which the Transport Block Set is transmitted between the MAC and the physical layer. It is preferable to keep the TTIs at 10 ms for the acknowledged mode data services, and so for this embodiment the summation period is preferably a 10 ms period, as illustrated in FIG. 6.

At the beginning of the period, the power control summation function is reset to zero. For every power control command that indicates the LNN should increase its power, the sum increases by one, and the physical layer responds by increasing the power by the correct amount. For every power control command that requests the LNN to decrease its power the sum will decrease by one, but in this case the transmit power will remain the same.

The power control commands therefore indicate that by the end of the summation period, the power level on the downlink should be less than it was at the beginning. However, in the preferred embodiment, the power level is kept constant during this period, which means that the power level will be higher at the end of the period than is strictly required for the pre-determined level of reliable transmission.

At the end of the 10 ms period, the magnitude and sign of the sum over the summation period are therefore examined and used to determine what kind of data is to be transmitted.

Preferably, the sum calculated over the summation period is also used to determine the downlink data rate used to transmit data in the following 10 ms period. This allows more acknowledge mode data requiring re-transmission to be re-transmitted, according to how much higher the power of the downlink is than the level required. A greater margin in the power level (indicated by a more negative sum) will mean that the data rate for the acknowledge mode data can be set higher than when the margin is smaller (indicated by a smaller sum). A sum of zero indicates that the power level has returned to the prescribed power levels required for the link. This could be because changes in the transmission environment have meant that more power is required than previously. The sum will therefore be understood to represent the total change in power averaged over the time period chosen, calculated on the basis of the instantaneous power commands.

The magnitude of the sum can therefore be used directly, as a scaling factor say for the data rate, or may be included in an exponential function. Furthermore, the mapping of the sum to the data rate will depend on a number of factors, such as the reliability of transmission required for the link, the frequency with which the power control commands are received, and the amount of data remaining in the buffer for re-transmission. It is therefore an implementation issue to decide.

Having determined whether the acknowledge mode data is to be transmitted, and possibly the rate at which such data is to be transmitted, the LCU transmits an indication to the MAC layer, via connection 503, to instruct the MAC on how much data to transmit. The procedure will then repeat accordingly.

Figure 7:
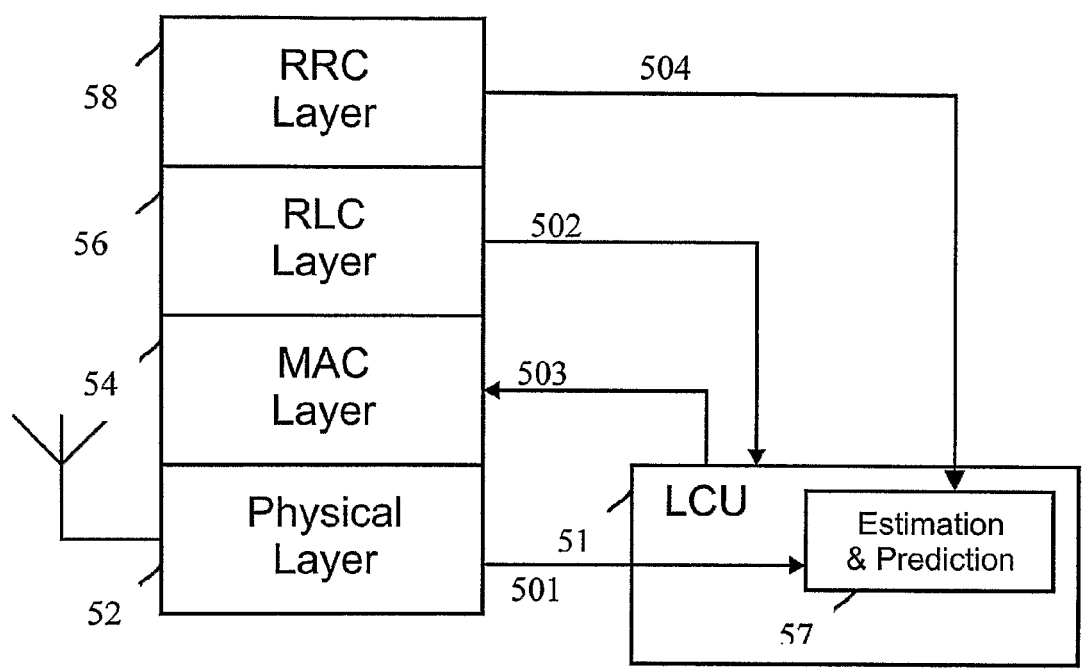
FIG. 7 illustrates an alternative embodiment of a preferred system for controlling data transmission.

In an alternative embodiment illustrated in FIG. 7, the power control commands are passed to an estimation and prediction function 57 in the LCU. In addition, the signal level and signal quality measurements made by the UE are passed from the UE to the RRC in the LNN and then to the estimation and prediction function via connection 504. The signal variations from the LNN to the UE will tend to be slow and continuous due to the in-door nature of the unit. In the second embodiment of the invention, therefore, an adaptive estimation and prediction filter function 57 is used to estimate and track the variation in the downlink signal based on the fast power control commands and the slower UE measurements. The implementation of the adaptive filter is not defined here but there are many techniques known by those skilled in the art. Examples are Kalman filters and techniques based on Bayes theorem and hypothesis testing. The adaptive filter output can then be used to estimate the most probable channel state for the coming period and from this the RLC acknowledged mode data rate can be selected. The LCU is arranged to inform the MAC layer and the MAC will select the data from the RLC for transmission by the physical layer.

Thus a transmission system has been described in which the physical layer, MAC layer and Radio Link Control layer are logically adjacent each other, and co-located in the same device, so that control of the acknowledge mode data can be made based on measurements made of the downlink by the physical layer. This also improves speed of communication between the physical layer and the RLC layer.

In particular, the transmission of the acknowledged mode data in the preferred embodiment depends on the power of the downlink, and preferably whether the total requested change in power over a predetermined transmission period is positive or negative. The link control unit is provided to monitor power control commands that are intended to maintain the power of the downlink at a predetermined standard power level, and to arrange for the power level to become slightly higher than required over the predetermined transmission period. This is achieved by maintaining the power level at the previous value when a request to decrease the power is received. Furthermore, the margin by which the power level exceeds the power level at the beginning of the period is preferably used to control the data rate at which the acknowledge mode data is transmitted.

It will be appreciated that the acknowledge mode is typically used with packet switched data transmission, where compensation can be made for packets arriving with a slight delay or in the wrong order. It therefore is used less often for circuit switched speech data, in which it is usually preferable to allow small glitches in the data to pass as these would be acceptable to the listener or viewer. Although speech data therefore typically uses the transparent mode of transmission, the acknowledge mode could theoretically be used.

Additionally, although the preferred embodiment has only described acknowledge mode data it will be appreciated that the re-transmission techniques set out above could be used in any system where re-transmission of data is required, not just those involving acknowledge mode data transmission.

Second Aspect

A further advantageous aspect of the preferred system will now be described. This aspect of the preferred system has two modes of operation, both of which rely on the principle of adjusting the relative frequency of one of two transmitted radio carriers. The first mode applies to the downlink common physical channels such as the synchronisation channels and the pilot channel. The second mode applies to the dedicated physical channels and utilises feedback information in the form of power control and measurement information from the UE to adjust the relative-phase of the two carriers. With the frequency offsets being so small, the necessary circuitry or functionality can easily be implemented in the baseband processing stages. It would most sensibly be applied to the spreading codes prior to the application of the scrambling codes.

It will first be beneficial to consider in slightly greater detail what occurs in typical known configurations. Then, the implementation of the preferred embodiment can be better explained.

Firstly, we shall consider the situation that occurs for the common physical channels. In a typical LNN deployment, the downlink signals arriving at the receiver of the UE will rarely travel directly from the transmitter to the receiver. In reality, the signals will arrive through multiple paths, suffering from reflections and diffractions. If there is a phase difference between these paths, then the signal will fade. To deploy a network, therefore, it is necessary to engineer into the link budget for the network, sufficient margins to ensure that the signal dips due to fading do not occur more than a certain percentage of time, or alternatively for a certain percentage of locations. In doing this, however, the mean amplitude of the signal will necessarily be greater than it would be if the fading signals were not present.

Figure 8:
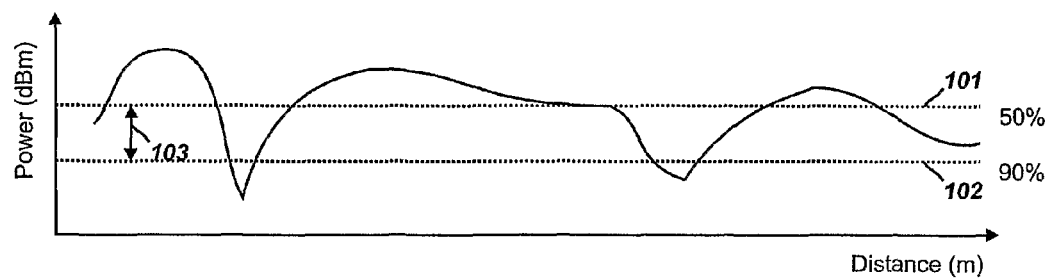
FIG. 8 illustrates the spatial variation of a fading signal.

This situation is illustrated in FIG. 8, in which we can see the signal variation along a single spatial dimension within the coverage area of the LNN. The first horizontal line 101 represents the probability of 50% coverage, that is for a given transmitter power the signal is successfully received at half of the locations. If a signal level of 50% was to correspond to the threshold of communications for the system, then this would mean that in 50% of the locations the signal would be below the minimum required.

The second line 102 represents the probability of 90% coverage, that is to say that for a given transmitter power the received power at the UE is above the power value of the second line 9 times out of 10.

If we wished to provide coverage in 90% of the locations therefore, and assuming that the threshold of communications for the system cannot be lowered from line 101, then we would need to raise the signal level by an amount 103 to ensure that we meet the 90% coverage requirements. This increase in power will however introduce an increase in the interference from the LNN to the macro cell network.

Figure 9:
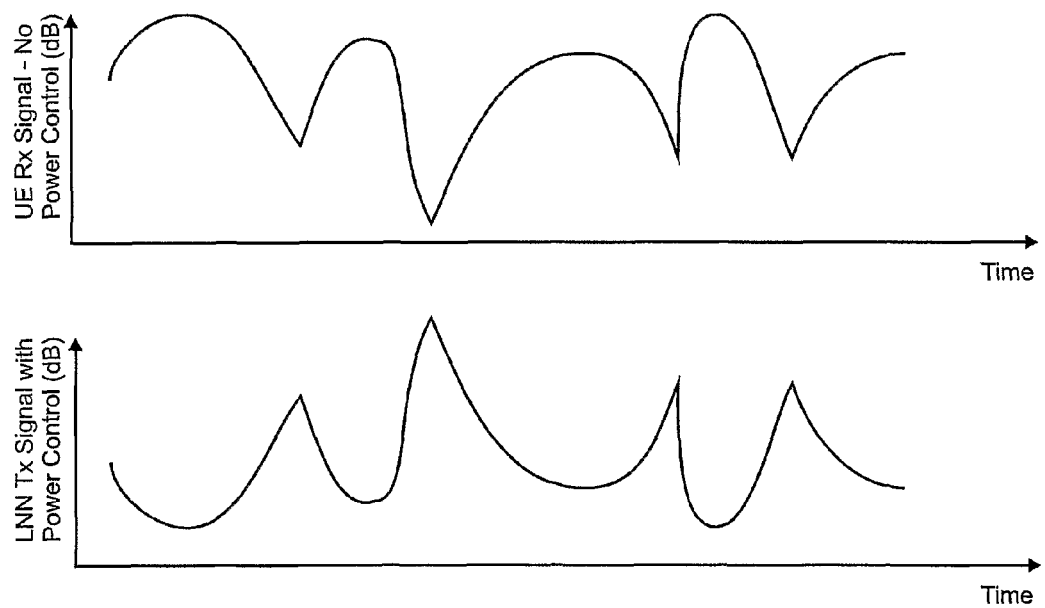
FIG. 9 illustrates the variation in received power at a receiver, and the corresponding changes in transmitter power to compensate.

Additionally, consider FIG. 9, which presents two curves. The first curve illustrates the amplitude of the envelope of the signal that may be received by the UE if no power control is applied. The signal will fade, and the depth of the fades will vary, but typically will be of the order of 10 dB-20 dB. If a power control technique is applied, the objective is to ensure that the power at the receiver remains constant so that fading in the receiver is reduced. To achieve this therefore, the transmitter in the LNN is instructed by the UE to adjust its power such that the net power at the receiver remains constant. A consequence of this is that the transmitter power will vary. The second curve in FIG. 9 illustrates the typical power variation, which is an inverse of the fading signal.

So although the receiver will experience a constant signal due to the transmitter power variation and the fading, other points in the network will see the amplitude variation caused by the increase in the transmitter power. This increase in transmitter power will directly affect the interference levels within the macro network.

Figure 10:
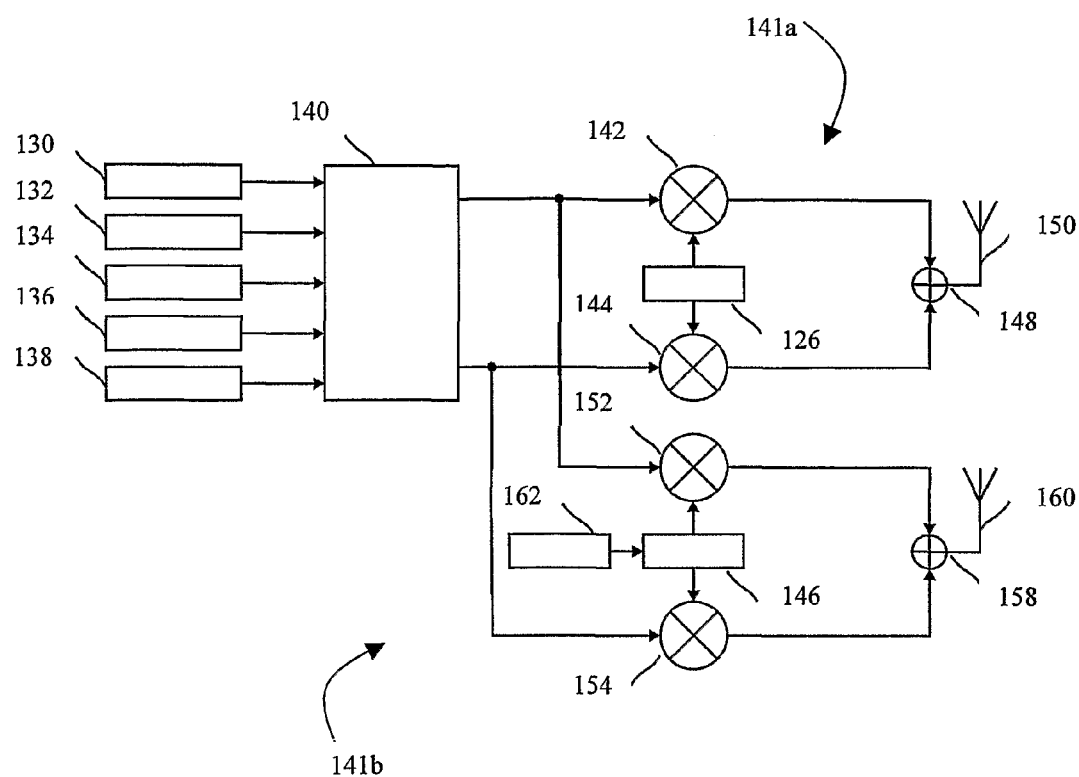
FIG. 10 illustrates the transmitter architecture in the preferred system.

We shall now consider an embodiment of the invention with reference to FIG. 10. This consists of a number of downlink common physical channels such as the Primary Common Pilot Channel (P-CPICH) 130, both of the Synchronisation Channel (SCH) 132, the Secondary Common Control Physical Channel (S-CCPCH) 134, the Primary Common Control Physical Channel (P-CCPCH) 136 and the Acquisition Indication Channel (AICH) 138. These channels are spread using the appropriate spreading code and scrambled in scrambler 140. Next they pass to two different transmission paths 141a and 141b. In the first transmission path 141a the signal is up-converted in two I-Q mixers 142, 144 by a quadrature local oscillator 146 before being summed in summer 148 and passed to a first antenna 150.

In the second transmission path 141b, the same baseband signal is up-converted in two I-Q mixers 152 and 154 by a quadrature local oscillator 156 before being summed in summer 158 and passed to a second antenna 160.

A mixing controller 162 is also provided, coupled to oscillator 136, to control the RF mixing stage so that an appropriate frequency offset is introduced. The frequency offset ensures that the signal from the second antenna is slightly out of phase with the signal from the first antenna, such that the signals received at the UE appear uncorrelated. The ideal frequency offset varies depending on which channel is being considered, but if a single frequency offset is used then a range of 5 Hz to 20 Hz has been found acceptable.

Figure 11:
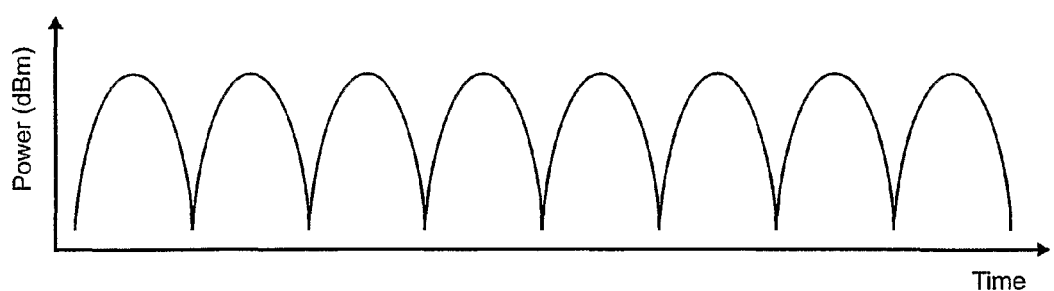
FIG. 11 illustrates time varying fading of a signal.

The effect of the frequency offset is that the signals from the two antennae appear to be un-correlated at the receiver. If the signals are sufficiently de-correlated, then a time varying fading pattern similar to the one shown in FIG. 11 will result for a UE at the same physical location due to the difference in phase of the received signals. Thus, a translation from a spatial fading probability to a time fading probability is achieved. If the UE was located within a fade, then the frequency offset from the second transmitter will cause the signal amplitude to vary and part of the time the signal at the UE will be out of the fade. This will mean that the transmitter signal level can be reduced without decreasing the coverage probability, although as a trade-off the time that it would take a UE to acquire the LNN cell is increased. In a home LNN cell with the users static or slow moving, this trade-off is acceptable, and advantageously allows the preferred embodiment to minimize interference. The techniques explained previously in connection with the transmission of the acknowledged mode data may then be used to improve transmission given that some times the power may be too low.

In particular, the transmitter could be modified to receive power control commands from the receiver, and to transmit the acknowledge mode data only when the received power at the receiver is at or near the peak of the oscillation. The minimum power level for reliable transmission will necessarily be lower than the peak value of the oscillation, so in this embodiment it will not be necessary to engineer periods where then power is higher than the predetermined level, as the cyclic variation in the power caused by the frequency off-set will in any case result in periods where the power is higher than the pre-determined level. In this context, at or near the peak can mean any time during which the received power is equal to or greater than the predetermined minimum level for reliable transmission, or any time during which the received power is higher than a second pre-determined level, the second pre-determined level itself being higher than the predetermined minimum level for reliable transmission.

In this example, the frequency offset is illustrated as occurring at the RF mixing stage and controlled by mixer controlling device 162. In an alternative embodiment however, the frequency offset could be implemented within the spreading stage 140 so that individual physical channels could have a frequency offset applied individually. The decision as to what frequency offsets should be applied is an implementation decision based on the results of field trials measuring the relative performances of the different channels given different offsets.

However in an alternative embodiment, a high frequency offset, such as two or more cycles per radio frame of 10 ms giving a frequency of 200 Hz, is preferred as it can result in the effect of the artificially induced fading being improved by interleaving within the system. The interleaving re-orders the data, so that a single portion of data is spread between the good and the bad parts of the fade. Any burst errors introduced by the fade are not therefore located in a single portion of data, but are caused to occur throughout a longer part of the signal by the de-interleaving that occurs at the receiver. The average error rate is therefore improved. Thus, for channels in which interleaving occurs, a frequency offset higher than 200 Hz is desirable.

We may summarise the likely desirable offsets for some of the channels as follows:
i) SCH channels benefit from a low frequency offset, due to the absence of interleaving, such as 5 Hz.
ii) The S-CCPCH and P-CCPCH carry information typically with a 10 ms interleaving depth, and so 2 or more cycles in this period may be beneficial, giving a frequency of 200 Hz or more. The P-CPICH is used by the P-CCPCH and the S-CCPCH and so the same frequency offset is preferably applied to that channel.

In the second embodiment of the invention, a phase offset is applied to the dedicated physical channel that is being utilised by a specific UE in addition to the frequency offset. Additionally, the second preferred embodiment includes a phase control or tracking loop, for estimating the phase at the receiver and altering the phase offset accordingly. There are three main parts to this aspect of the operation of the preferred system. The first part relates to the initial phase setting of the second transmission path 121b. The second part is the provision of an adaptive loop that keeps the phase adjustment synchronised with the fading signal in order to track the fade and the third part is a periodic re-setting to ensure that the optimum phase setting is being utilised. This periodic phase reset could occur when the activity on the dedicated channel is low, for instance during a pause in the speech conversation. In this way, it can be arranged that any dip in signal will not affect the service, only the Dedicated Physical Control Channel (DPCCH) that is transmitted continuously.

Figure 12:
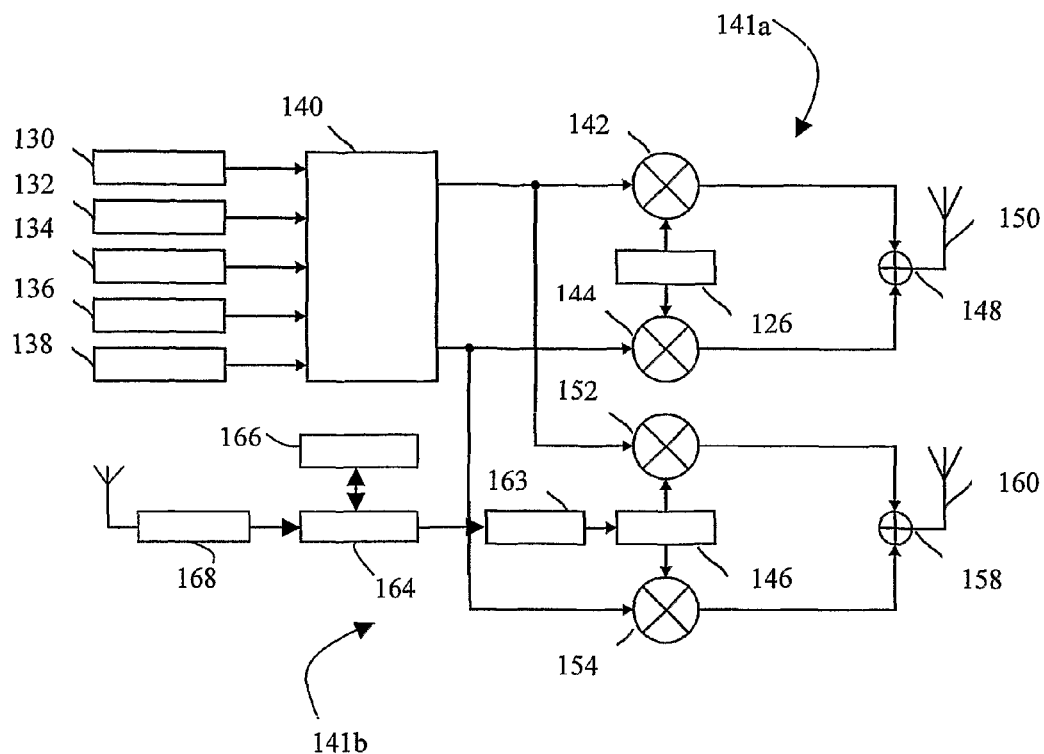
FIG. 12 illustrates a second preferred embodiment of the invention.

Reference should now be made to FIG. 12, which illustrates the second embodiment. The configuration of the transmitter is almost identical to that shown in FIG. 10, however the frequency offset controller 162 is replaced with frequency and phase offset controller 163, coupled to a processor 164 and memory 166. This operates to provide both a frequency offset and a phase offset for the second signal. The processor is also coupled to a receiver 168. The offset controller, the processor and memory, and the receiver form the tracking loop.

Although the receiver 168 has been shown as a separate element, this is only for convenience. It will be appreciated that the antennae 130 and 140 preferably have a dual transmitting and receiving function, and so could be used in place of the separate antenna 168.

The downlink dedicated physical channels are therefore spread and scrambled in scrambler 140 and then passed to the two transmission paths 141a and 141b. In the up-converter of the first transmission path 141a, two mixers 142 and 144 translate the spread and scrambled signal to RF frequency I and Q signal components using the local oscillator 146. The components are then combined in summer 148 and passed to the first antenna 150.

In the quadrature up-converter of the second transmission path 141b, the two I and Q signal components are passed to the two mixers 152 and 154 and are mixed using a phase shifted second local oscillator 156, before being combined in summer 158 and passed to an antenna 160. As before, the frequency shift or phase shift is introduced by phase offset controller 163 in the RF stage, or alternatively in the spreading stage 140.

Initially, a constant frequency offset is applied according to the type of channel, and we assume that the fading via the two transmission paths is independent or has a low cross correlation. No phase offset is necessarily applied at this point. The UE therefore receives the signals from the two antennas giving an envelope for the received signal that is varying in amplitude, as shown in FIGS. 10 and 13.

Figure 13:
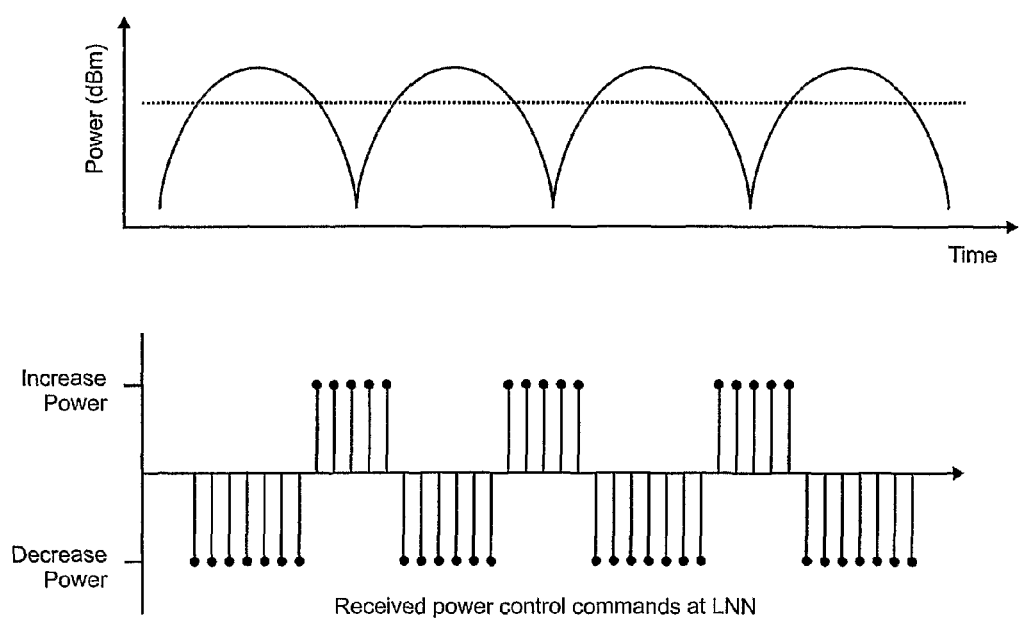
FIG. 13 illustrates the power control commands received at the LNN from the receiver.

As shown in FIG. 13 in more detail however, the UE will generate power control commands that instruct the LNN to increase or decrease the transmit power. This is illustrated in the lower part of FIG. 13 by a sequence of pulses. Pulses above the line indicate that the LNN should increase its power, while pulses below the line indicate that the LNN should decrease its power. The power control commands are sent every 667 microseconds slot, and consequently for a frequency offset of 100 Hz say, 15 power control commands would be received within one period of the 100 Hz cycle, (that is 1/(100*667e-6)).

It will be appreciated that the frequency offset introduced results in a constantly changing phase of the second signal with respect to the first signal at the UE. What we are interested in determining is the phase difference between the two signals when the received signal power is at its peak. This will be different for the UE depending on its location and the transmission environment. In doing so, we can then transmit the two signals without the frequency offset, but with the necessary phase difference, to ensure that the received signal power at the UE lies at the peak, and not in the fade. Of course, if the UE moves a significant distance, or if the transmission environment changes by a significant amount, we will need to calculate the phase timing for the top of the fade again.

The power control commands shown in the bottom half of FIG. 13, are used to determine the phase of the received signal power at the UE, relative to the transmitted signal. Processing of the power control commands within the LNN will now be described in more detail. There are a number of different options for how to process the power control commands within the LNN. In the simplest case, the power control waveform may be interpreted as a rectangular pulse train, and the middle of the peaks in the received signal could be located based on a simple counting algorithm.

Since, the pulses occur at regular periods, the relative timing of the middle of the peaks can be deduced in comparison to a fixed reference point, such as the start of a cycle of the un-phase shifted signal. Then accounting for all of the relative delays in the transmission path, the processor 166 in the LNN can deduce what phase off-set for the second signal corresponds to the timing of the peak of the signals at the UE. Preferably the determination of the peak position is performed a number of times, and the average position of the centre of the peak calculated. Having determined what phase off-set is appropriate, the constant frequency off-set is removed, so that both of the first and second transmission paths transmit at the same frequency. The phase off-set that has been determined is then applied to the second signal path, so that received signal at the UE is located at the top of the previously time varying signal pattern. As the time variation in the received signal is no longer present, the UE should remain at the peak or near to the peak, unless sudden changes in position or environment occur.

In a preferred implementation, the received power control commands are in fact interpreted as a simple delta modulation scheme. Such schemes are often used in voice encoding and will be familiar to those skilled in the art. By employing a delta modulation decoder in the LNN, the received signal waveform from the UE can be reconstructed in the LNN.

Next, the amplitude measurements made by the UE are used to calibrate the peak value at the UE. This allows the LNN to decide whether the maximum received level is too great or too small for the required performance over the coverage area. The transmit power level can then be adjusted accordingly.

Having fixed the phase offset for the second transmission path, we now need to ensure that this remains at an optimum value as the UE moves or as the signals to the UE change. The simplest approach is to implement a gradient optimisation algorithm, and allow the rate of phase change to vary slightly. In this way, the shape of the received power waveform at the UE can be deduced, and tracking of the peak can occur.

The tracking loop uses two settings to estimate the required phase setting. One setting will be: (current phase offset minus delta) and the other (current phase offset plus delta), where delta is a small phase change. At intervals, the phase of the second signal is varied by an amount delta, and the reported amplitude of the received signal power at the UE monitored and stored in memory 166. If the received signal power decreases in magnitude, then the phase is reset to the previous value and varied by an amount delta in the opposite direction, and the change in signal amplitude monitored again. If the signal amplitude is also decreased by phase changes in the opposite direction, then the current phase off-set is left unaltered. If the amplitude increases however, by adjusting the phase off-set in either direction, then the phase off-set is selected to be the value giving the greater amplitude.

Alternatively, the phase off-set could be allowed to vary at a suitable rate such as 5 degrees per WDCMA slot (typically one power control message per slot) in both direction until power control commands indicating a desired increase in power were received. The phase could then be set at the mid-way point between the points at which the low power control commands were received. The rate of change of phase could be chosen to reflect the speed of the UE, by measuring the fading rate of the transmit signal from the UE.

The final part of the second aspect is a periodic resetting of the relative phases. This may be required to find a better peak location, or in case things have drifted. The trigger of this could be for multiple reasons. Either periodically (every 1 s or more), every time DTX is active in the audio codec, or when the received power control commands are continuously requesting an increase.

In any of the case the trigger will cause the initial phase search to occur as described previously. The subsequent tracking stage would then take control once the optimum location is found.

Thus, a number of transmission schemes have been described, each offering improved reliability of transmission, without unduly increasing the power of the transmission link.

The invention claimed is:

1. A transmitter comprising:
 a memory for storing a first data that is to be transmitted, and a second data that has been transmitted;
 a processor for receiving requests to re-transmit the second data from the memory;
 a monitor for receiving, from user equipment, power control commands indicating a change in power to maintain, at a predetermined level, a power of a transmission link between the transmitter and a receiver associated with the user equipment and for separately summing a number of power control commands indicating that an increase in power is necessary and a number of power control commands indicating that a reduction in power is necessary over a predetermined period of time;
 a power control unit electrically connected to the monitor, and configured to:
 control the power of the transmission link such that the power is temporarily higher than the pre-determined level; and
 maintain the power of the transmission link at a previous level after receiving a power control command from the user equipment that requests a reduction in power; and
 a data control unit configured to schedule the second data for re-transmission in periods when the power of the transmission link is higher than the pre-determined level based at least in part on a difference in sums.

2. A transmitter according to claim 1, wherein the data control unit is configured to control a data rate of the second data when the second data is re-transmitted based on a difference between the power level of the transmission link and the pre-determined level.

3. A transmitter according to claim 1, wherein the data control unit is configured to control a data rate based on an amount of data that requires re-transmission.

4. A transmitter according to claim 1, wherein the data control unit is configured to receive signal quality measurements of the transmission link between the transmitter to the receiver, and to schedule the second data for re-transmission based on an estimation of a channel state.

5. A transmitter according to claim 1, wherein the power control unit is configured to transmit only the first data in periods wherein the power level of the transmission link is equal to the pre-determined level.

6. A transmitter according to claim 1, wherein the power control unit is configured to increase the power of the transmission link when a power control command is received that instructs the power control unit to increase the power of the transmission link, but to maintain the power of the link at the previous level when a power control command is received indicating that a reduction in power is necessary.

7. A transmitter according to claim 1, wherein the data control unit is configured to determine a data rate for the second data depending on the magnitude of the sum.

8. A transmitter according to claim 1, wherein the predetermined period of time is a multiple of a transmission time interval (TTI) for the transmission link.

9. A transmitter according to claim 8, wherein the predetermined period is approximately 10 ms.

10. A transmitter according to claim 1, further comprising a housing accommodating a Physical Layer, a Medium Access Control Layer, and a Radio Link Layer according to an Open Systems Interface transmission model.

11. A transmitter according to claim 10, wherein the memory comprises a buffer provided in the Radio Link Layer; the power control unit is provided in the Physical Layer, and the data control unit is configured to receive an indication of a quantity of second data for re-transmission from the Radio Link Layer, and to indicate to the Medium Access Control Layer what data is to be transmitted.

12. A transmitter according to claim 11, wherein the housing also accommodates a Radio Resource Control layer, and the data control unit is configured to receive measurements of signal quality from a Radio Resource Controller.

13. A method of transmitting data from a transmitter to a receiver associated with an user equipment, the method comprising:
   transmitting a first data from the transmitter to the receiver;
   storing the first data that has been transmitted as a second data;
   receiving requests from the receiver to re-transmit the second data;
   receiving power control commands indicating a change in power to maintain, at a predetermined level, a power of a transmission link between the transmitter and the receiver;
   separately summing a number of power control commands indicating that an increase in power is necessary and a number of power control commands indicating that a reduction in power is necessary over a predetermined period of time;
   controlling the power of the transmission link such that the power is temporarily higher than the pre-determined level; and
   scheduling the second data for re-transmission in periods when the power of the link is higher than the predetermined level based at least in part on a difference in sums;
   wherein the power of the transmission link is controlled to be maintained at a previous level after receiving a power control command from the user equipment that requests a reduction in power.

14. The method of claim 13, further comprising controlling a data rate of the second data when the second data is re-transmitted based on a difference between the power level of the transmission link and the pre-determined level.

15. The method of claim 13, further comprising controlling a data rate based on an amount of data that requires re-transmission.

16. The method of claim 13, further comprising receiving signal quality measurements of the link between the transmitter to the receiver, and re-transmitting the data based on an estimation of a channel state.

17. The method of claim 13, further comprising transmitting only first data in periods where the power level of the transmission link is equal to the pre-determined level.

18. The method of claim 13, further comprising increasing the power of the transmission link when a power control command is received indicating that this is necessary, but maintaining the power of the link at the previous level when a power control command is received indicating that a reduction in power is necessary.

19. The method of claim 13, further comprising determining a data rate for the second data depending on a magnitude of the sum.

20. The method of claim 13, wherein the predetermined period of time is a multiple of a transmission time interval (TTI) for the transmission link.

21. The method of claim 20, wherein the pre-determined period is approximately 10 ms.

* * * * *